United States Patent
Fyke

(10) Patent No.: US 7,320,600 B2
(45) Date of Patent: Jan. 22, 2008

(54) DEVICE OPENER AND VIBRATION MECHANISM

(75) Inventor: Steven Fyke, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 11/256,991

(22) Filed: Oct. 25, 2005

(65) Prior Publication Data

US 2007/0093081 A1  Apr. 26, 2007

(51) Int. Cl.
*H01R 39/00* (2006.01)

(52) U.S. Cl. .................................... 439/31; 455/90.3

(58) Field of Classification Search .................. 439/31, 439/260, 15–16, 139, 145; 16/303, 367, 16/82; 455/575.3, 90.3; 267/134, 153
See application file for complete search history.

(56) References Cited

U.S. PATENT DOCUMENTS

| | | | | |
|---|---|---|---|---|
| 4,426,752 | A | * | 1/1984 | Nakayama ..................... 16/82 |
| 5,413,317 | A | * | 5/1995 | Spoerre ...................... 267/134 |
| 6,374,089 | B1 | | 4/2002 | Till |
| 6,885,849 | B1 | * | 4/2005 | Kim et al. ................. 455/90.3 |
| 6,925,684 | B2 | | 8/2005 | Kang et al. |
| 7,003,334 | B2 | * | 2/2006 | Jung ......................... 455/575.3 |
| 7,203,995 | B2 | * | 4/2007 | Hsu et al. ..................... 16/330 |
| 2005/0050683 | A1 | | 3/2005 | Tonogai |
| 2005/0095995 | A1 | | 5/2005 | Bae |

FOREIGN PATENT DOCUMENTS

| | | |
|---|---|---|
| EP | 1182849 A | 2/2002 |
| EP | 1517520 A | 3/2005 |
| EP | 1528755 A | 5/2005 |
| WO | 0021155 A | 4/2000 |
| WO | 2004062238 A | 7/2004 |

OTHER PUBLICATIONS

Autofolder Modules, http://sem.samsung.co.kr/cms/ifweb/en/products/Showing. Auto Folder Module; Oct. 17, 2005.
Auto Folder Module, Samsung Electro-Mechanics, Published prior to Aug. 28, 2005.
Auto Slide Road Map, Samsung, Published Prior to Aug. 28, 2005.
Autofolder Modules; Samsung Electro-Mechanics—p. 1—Oct. 17, 2005.
Auto Folder Module; Samsung Electro-Mechanics—pp. 1-4, 8—prior to Oct. 17, 2005.
Auto Slide—Road Map; Samsung—cover page—prior to Oct. 17, 2005.

* cited by examiner

*Primary Examiner*—J. F. Duverne
(74) *Attorney, Agent, or Firm*—Ridout & Maybee

(57) ABSTRACT

An electronic mobile device having a first body, a second body mounted to the first body for movement relative to the first body between first and second positions, at least one of the first body and second body housing electronic circuitry. An electronic drive motor is linked to first body and the second body for moving the bodies relative to each other, the drive motor being operable in a first mode for effecting movement of the second body from the first position to the second position and operable in a second mode for effecting repetitive movement of the second body relative to the first body for generating a vibration alert.

18 Claims, 4 Drawing Sheets

DEVICE OPENER AND VIBRATION MECHANISM

FIELD

The present application relates to mobile electronic device vibration mechanisms and opening and closing mechanisms.

BACKGROUND

When an electronic device such as a cellular phone, Personal Digital Assistant, etc. is running, there will normally be intermittent generation of sensible alerts that will attract the device user's attention. For example, the device might be configured to draw the device user's attention to an occurrence (for example, receipt of a new e-mail or text message or incoming phone call or a preset alarm time being reached) within the device by means of a vibrator and/or sound (for example, ringtone) alert.

The vibrator (as opposed to the sound alert) is particularly useful for providing discreet notification, and in current electronic communication devices it typically comprises an electric motor connected to an unbalanced weight. In some cases, mobile electronic devices have at least two body parts that are movable relative to each other between opened and closed positions, and some such devices include an electronic motor for effecting such motion.

It would be advantageous to improve vibrators and openers in electronic communication devices.

SUMMARY

According to one example embodiment is an electronic mobile device including a first body and a second body mounted to the first body for movement relative to the first body between first and second positions, at least one of the first body and second body housing electronic circuitry. An electronic drive motor is linked to first body and the second body for moving the bodies relative to each other, the drive motor being operable in a first mode for effecting movement of the second body from the first position to the second position and operable in a second mode for effecting repetitive movement of the second body relative to the first body for generating a vibration alert.

According to another example embodiment is a method for effecting vibrations in a mobile electronic device having a first body and a second body movably mounted together and a drive motor for moving one body relative to the other body between a first position and a second position in a first mode of operation, the method including, in a second mode of operation, driving the motor to repeatedly move one body relative to the other body to cause the mobile electronic device to vibrate.

According to yet another example embodiment is a computer program product having a computer-readable medium tangibly embodying computer executable instructions for effecting vibrations in a mobile electronic device having a first body and a second body movably mounted together and a drive motor for moving one body relative to the other body between a first position and a second position in a first mode of operation, the instructions including instructions for, in a second mode of operation, driving the motor to repeatedly move one body relative to the other body to cause the mobile electronic device to vibrate.

According to another example embodiment is a controller for controlling a drive motor that is operably connected to each of a first body and a second body of a mobile electronic device to move the bodies relative to each other, the controller being configured for, in a first mode of operation, causing the drive motor to move one body relative to the other body selectively between a closed position and an open position or between an open position to a closed position, and in a second mode of operation, causing the drive motor to repeatedly move one body relative to the other body to cause the mobile electronic device to vibrate.

Further aspects of the invention will be apparent from the attached drawings and the description of example embodiments set out below.

BRIEF DESCRIPTION OF THE DRAWINGS

Reference will now be made, by way of example, to the accompanying drawings which show example embodiments of the present invention, and in which.

Similar reference numerals may be used in different figures to denote similar components.

DESCRIPTION OF EXAMPLE EMBODIMENTS

Figure 1:
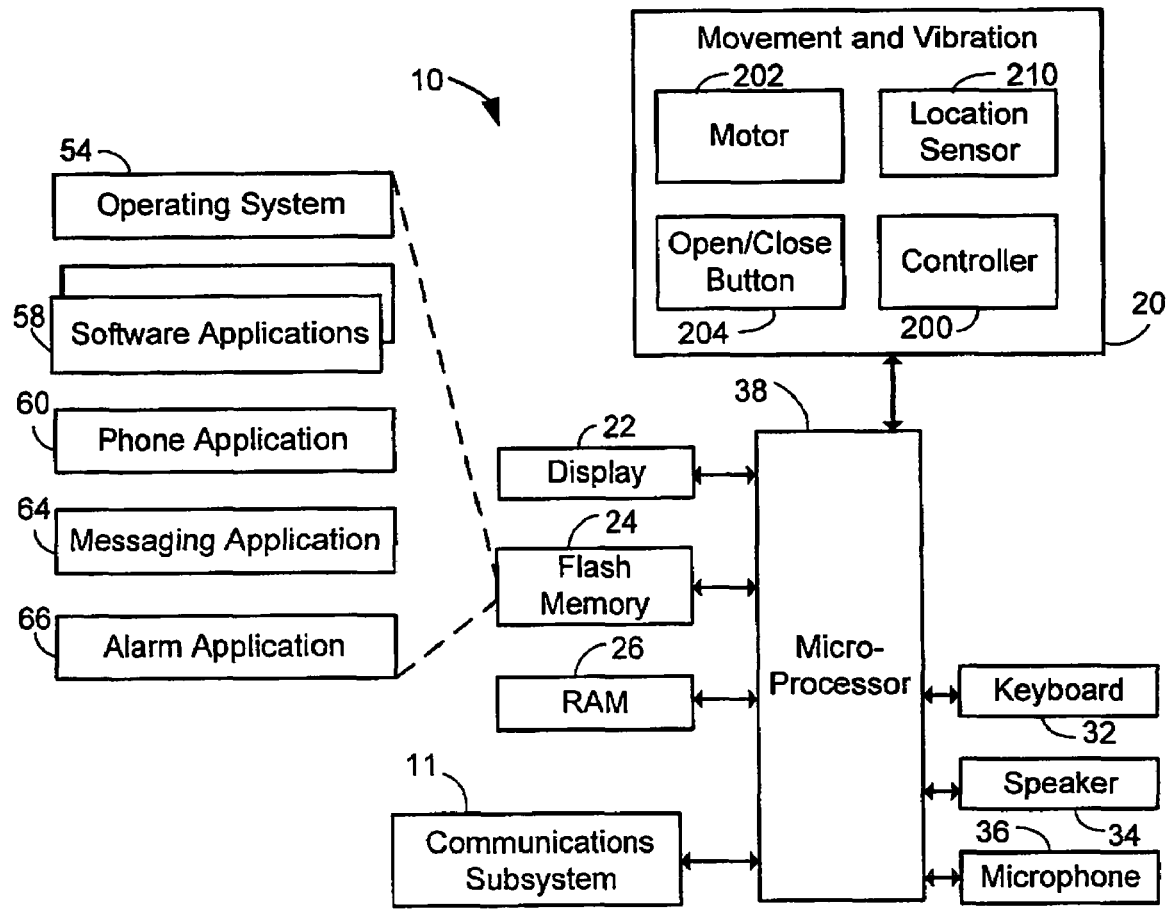
FIG. 1 shows a block diagram of a mobile electronic device to which embodiments of the present invention can be applied.

Referring now to the drawings, FIG. 1 shows a block diagram of a mobile electronic device 10 to which example embodiments of the invention can be applied. In at least one example, the electronic communication device 10 is a wireless two-way mobile communication device having data and possibly also voice communication capabilities. Depending on the functionality provided by the device 10, in various embodiments the device may be a data communication device, a multiple-mode communication device configured for both data and voice communication, a mobile telephone, or a Personal Digital Assistant (PDA), among other things.

In the illustrated embodiment, the device 10 includes a wireless communications subsystem 11 for exchanging communications with one or more wireless communications networks. However, embodiments of the invention can also be applied to devices that are not enabled for wireless communications.

The device 10 includes a microprocessor 38 that controls the overall operation of the device. The microprocessor 38 interacts with the communications subsystem 11 and also interacts with further device subsystems such as a display 22, automatic device movement and vibration subsystem 20, flash memory 24, random access memory (RAM) 26, keyboard or keypad 32, speaker 34, microphone 36, and other device subsystems.

Operating system software 54 and various software applications 58 used by the microprocessor 38 are, in some example embodiments, stored in a persistent store such as flash memory 24 or similar storage element, and such software or parts thereof, may be temporarily loaded into a volatile store such as RAM 26.

The microprocessor 38, in addition to its operating system functions, can enable execution of software applications 58 on the device. A predetermined set of software applications 58 which control basic device operations, including data and voice communication applications for example, will normally be installed on the device 10. In some examples of the device 10, a phone application 60 enabling operation of the device as a wireless phone is installed; in some embodiments a messaging application 64 is installed on the device 10, enabling the sending, receiving and displaying of text/ SMS and/or email messages. The software resident on the device 10 may also include an alarm application 66 for allowing the user to set the generation of a sensible alarm at a particular time (or date and time).

As will be explained in greater detail below, the device 10 includes two body parts that are movable relative to each other between a first position and a second position (which may be associated with open and closed positions, respectively). The movement and vibration system 20 of the device 10 includes an electronic drive motor 202 that performs dual functions of moving one of the body parts relative to the other to open and close the device, and also moving one of the body parts relative to the other to provide a vibration alert to the user of the device. Thus, in the device 10, only a single electric motor is required for performing the functions of opening and closing the device and vibrating the device. Operation of the motor 202 is controlled by a controller 200, which in various embodiments may include hardware circuitry components (including integrated circuits and/or wired circuitry), firmware circuitry components, software components stored on the device 10 and executable by microprocessor 38 or a separate device processor, and/or various combinations of the forgoing components. In at least one embodiment, the device 10 includes an open/close button 204 on an outer surface of the device that a user can press to actuate opening and closing of the device, and a location sensor 210 that can provide feedback to controller 200 as to the relative locations of the first and second body parts.

Figures 2, 3:
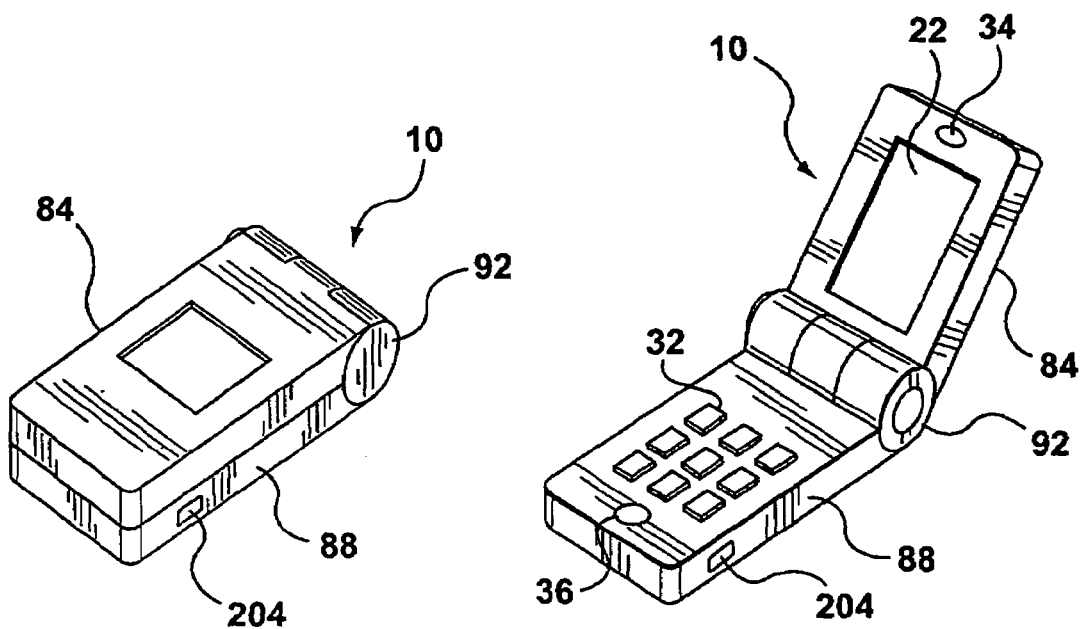
FIG. 2 is a perspective view of an example flip-style version of a mobile electronic device, in a closed position, to which embodiments of the present invention can be applied.
FIG. 3 is a perspective view of the device of FIG. 2, in an open position.

With further reference to FIGS. 2 and 3, in at least one embodiment, the mobile electronic device is a flip-style device having a first or top body 84 and a second or bottom body 88 that are connected to each other in a manner permitting guided rotational movement of the bodies relative to each other about hinge assembly 92 within a range between fully opened (FIG. 3) and fully closed (FIG. 2) positions. The device 10 will be in the fully closed position when the first body 84 is brought down to rest (or close to rest) upon the second body 88. When the device 10 is in the other terminal position (the fully opened position) the body 84 will be at least at an obtuse angle in relation to the body 88; however how far the body 84 will open away from the body 88 will vary amongst devices.

Often the top body (typically thinner than the bottom body) houses the speaker 34 and/or the display 22 (but it could also just be a cover), while often the bottom body houses the keyboard 32, microphone 36 and a majority of the electronic circuitry, including the microprocessor 38 of the device. However, the components housed within or carried by each of the bodies 84, 88 can vary from device to device. When the device 10 is "closed", one face of the top body 84 at least substantially covers a face of the bottom body 88, and likewise the covered bottom body face also at least substantially covers the covering top body face. Conversely, when the device 10 is "opened", the previously covered faces are exposed. User actuation of open/close button 204, which may be located on surface of the device 10 that is exposed in both open and closed positions, results in actuation of the drive motor 202 to move the top body 84 relative to the bottom body 88.

Figures 4, 5:
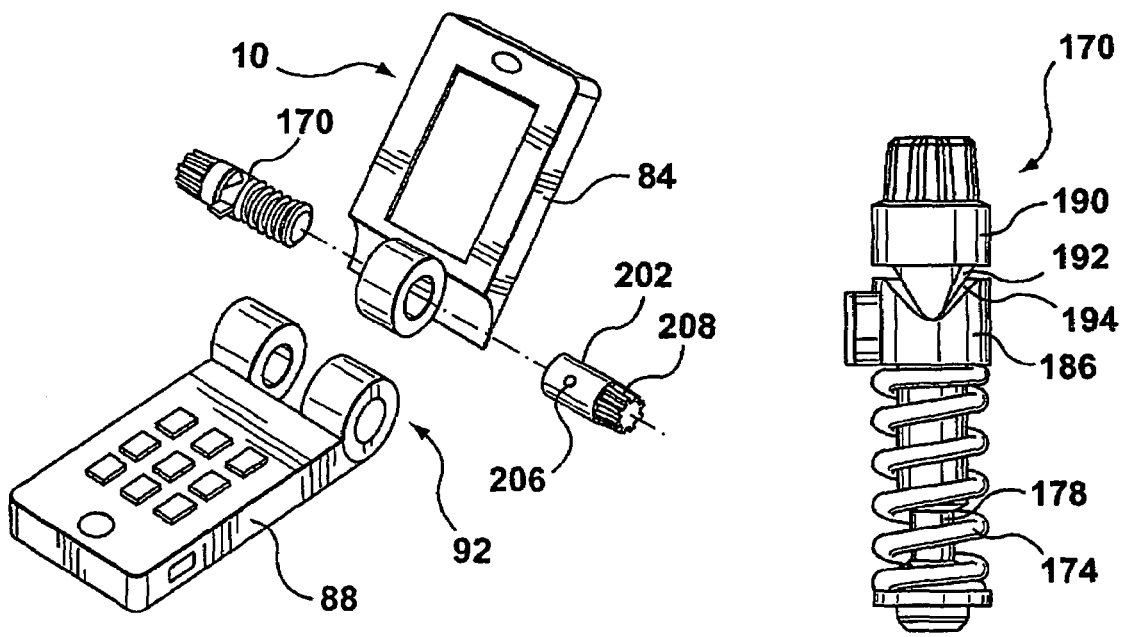
FIG. 4 is an exploded perspective view of the device of FIG. 2, in an open position.
FIG. 5 shows an axial hinge pin assembly of an embodiment of a hinge assembly of the device of FIG. 2.

FIG. 4 shows a diagrammatic exploded view of the flip type electronic communication device 10, showing the hinge assembly 92 in greater detail. In at least one example embodiment, the drive motor 202 is located within the hinge assembly 92, and includes a first portion 208 (for example a motor housing assembly containing an armature assembly) fixed to the bottom body 88 and a second portion 206 (linked for example, by one or more gears and/or cams to a drive shaft of the motor armature assembly) fixed to the top body 84. In use, the motor rotates second portion 206 relative to first portion 208 to effect opening and closing of the device 10. In at least one example embodiment, a biasing hinge pin assembly 170 is also included in hinge assembly 92. The biasing hinge pin assembly 170 is configured to both i) urge the folding bodies 84, 88 to the fully closed position within a certain range of rotation; and ii) urge the folding bodies 84,88 to the fully opened position within another range of rotation. An example of how this can be achieved will be described in connection with FIG. 5. Biasing hinge pin assembly 170 includes a coil spring 174 mounted on a shaft 178 applying bias pressure to a cam 186 that is fixed relative to bottom body 88. The hinge pin assembly 170 also includes cam follower 190 at an end of the shaft 178 that is fixed relative to the top body 84. In some embodiments, the drive motor 202 and the hinge assembly 92 can be integrated together as a single unit.

Engagement surfaces 192 and 194 of the cam follower and cam 190 and 186 respectively are ramped so that the cam 186 will compress the spring 174 as the cam follower 190 is rotated out of the illustrated trough position. When the cam follower 190 is moved out of the trough position, the spring 174 will act to resist compression and urge the cam follower 190 back into the original trough position or into a second trough position if the cam follower 190 has been rotated past a peak position where the spring 174 is at its most compressed. Also, it will be understood that the there will be an increase in potential energy stored in the spring 174 if a force acts against and in excess of the spring's biasing force to deform (compress) the spring 174 in the process of causing the cam follower 190 to move along the ramped surface 194 of the cam 186. This force acting against the biasing force could be supplied by, for example, torque applied to the bodies 84, 88 by motor 202 within the hinge section 92. When moving the top body 84 from either the open position to the closed position, or vice versa, the motor 202 must apply sufficient torque to get the spring 174 past it maximum level of compression (where is stored energy is at a maximum)—beyond that point, the spring then releases its energy and cooperates with the motor to move the top body to the desired position.

Figure 6:
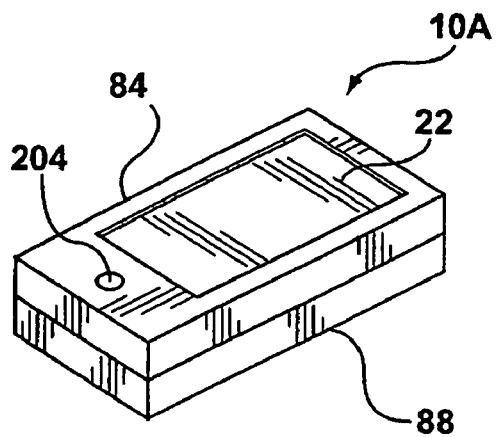
FIG. 6 is a diagrammatic perspective view of an example slide-style version of the device, in a closed position, to which embodiments of the present invention can be applied.
Figure 7:
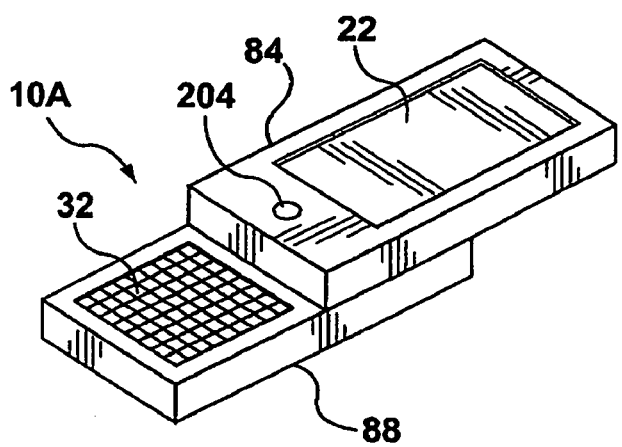
FIG. 7 is a diagrammatic perspective view of the device of FIG. 6, in an open position.
Figure 8:
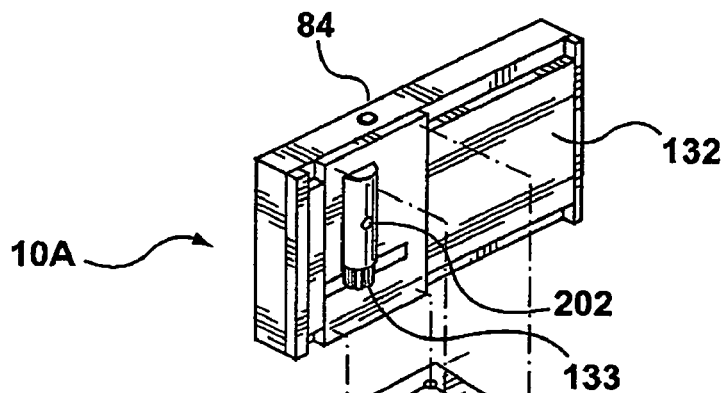
FIG. 8 is a diagrammatic exploded perspective view of the device of FIG. 6, in an open position.

In other example embodiments, the mobile electronic device can be a slide-style communication device. FIGS. 6-8 provide a diagrammatic illustration of a slider-style device 10A. Again, the device 10A, which in at least one embodiment has the components shown in FIG. 1, includes first or top body 84 and second or bottom body 88. (In respect of both device 10 and 10A, the top body is referred to, arbitrarily, as the first body and the bottom body is referred to herein, arbitrarily, as the second body; however it will be understood that it would not make a difference if, for example, the bottom body was referred to as the first body and the top body was referred to as the second body.) In device 10A, the body 88 is connected to the body 84 in a manner permitting linear guided movement of the bodies relative to each other within a range between fully opened and fully closed positions. By this movement, length of the device 10A is either expanded or contracted.

Figure 9:
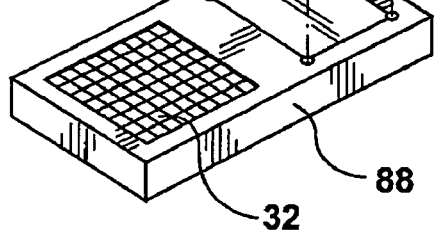
FIG. 9 is a diagrammatic side view illustrating a slide assembly of the device of FIG. 6.
Figure 9:
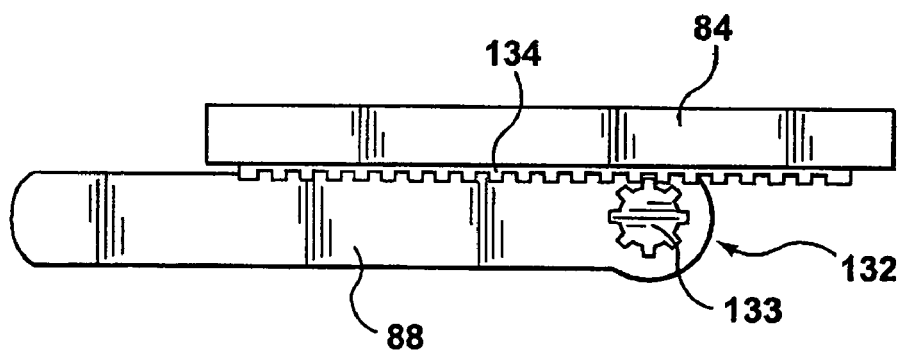

With reference to FIGS. 8 and 9, the device 10A includes a slide assembly 132 at an interface between the bodies 84 and 88. The slide assembly 132 contains components, including drive motor 202 of the movement and vibration system 20 for automatic relative movement of the bodies 84 and 88. In at least one of the examples, guided movement is facilitated by a pinion 133 that cooperates with a rack section 134. In the illustrated embodiment, the pinion 133, which is driven by drive motor 202, is fixed to the bottom body 88 and drivingly engages the rack section 134, which is fixed to the top body 84.

Figure 10:
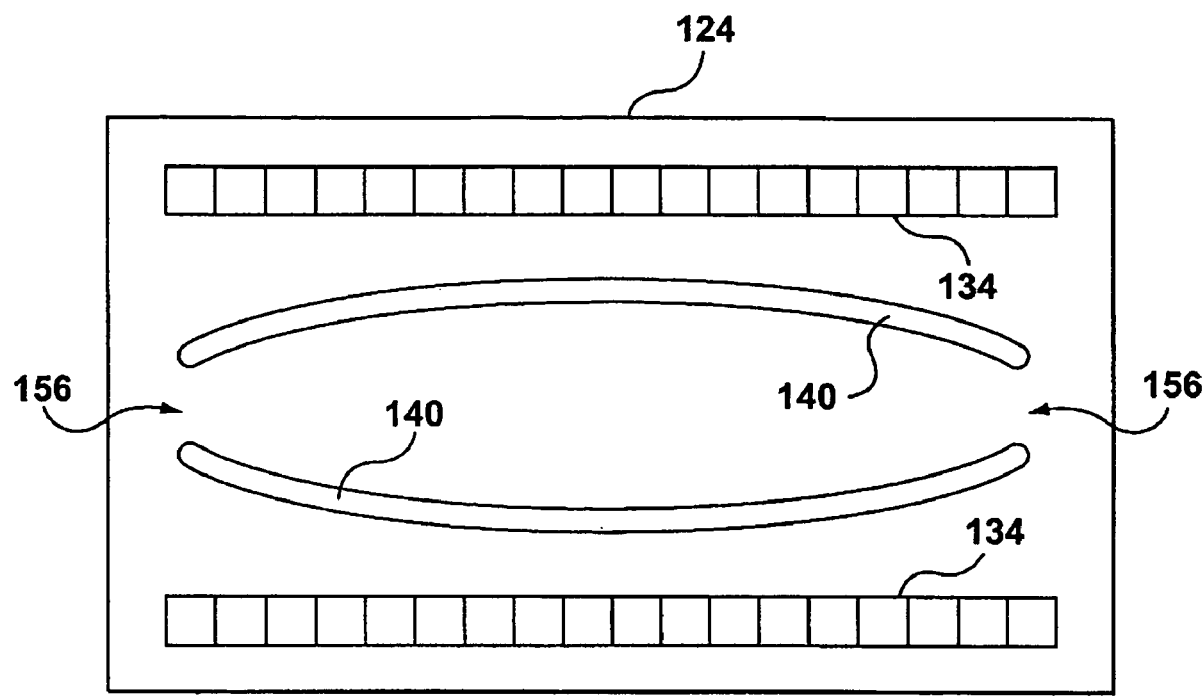
FIG. 10 is a diagrammatic bottom view of an example of a rack-side portion of a slide assembly for the example device of FIG. 6.
Figure 11:
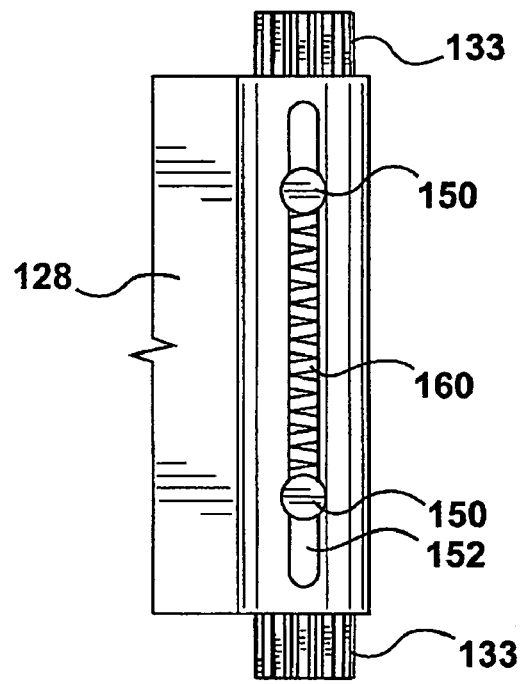
FIG. 11 is a diagrammatic top view of an example of a pinion-side portion of a slide assembly for the example device of FIG. 6.

As with flip type device 10, in at least one example embodiment, the slide assembly 132 of slide-type device 10A includes a biasing mechanism to urge the top and bottom bodies into the fully opened position when the bodies are more opened than closed, and urge the bodies into the fully closed position when the bodies are more closed than opened. (In some embodiments of the devices 10, 10A the biasing mechanism may only urge the device into only one of the fully closed or open positions.) One example of a biasing mechanism suitable for the slide mechanism 132 will now be described with reference to FIGS. 10 and 11, which show respectively a rack-side portion 124 of slide assembly 132, and a pinion-side portion 128 of slide assembly 132. Curved slots 140 are provided in rack-side portion 124 as shown in FIG. 10. Referring to FIG. 11, the example mechanism also includes a pair of grooved sliders 150 that engage both the rack-side slots 140 and a pinion-side slot 152 that extends in pinion-side portion 128 of the slide assembly 132 in a direction generally transverse to rack side slots 140. It will be understood that as the sliders 150 are moved along the slots 140 they will become further displaced away from each other or closer together depending upon whether they are near the middle of the slots 140 or at one of ends 156 corresponding to either the fully opened or fully closed position. A coil spring 160 is attached between the sliders 150, such that the coil spring 160 urges the sliders 150 towards each other when the coil spring 160 is stretched out. When the sliders 150 are positioned away from the ends 156, the coil spring 160 will be extended and will exert a force to move the sliders together, and thus, due to the curved nature of slots 140, to one of the ends 156. In particular, if the sliders 150 are closer to the end 156 that corresponds to the fully opened position, then the coil spring 160 will urge the bodies 84 and 88 towards the fully opened position. Likewise, if the sliders 150 are closer to the end 156 corresponding to the fully closed position, then the coil spring 160 will urge the bodies 84 and 88 towards the fully closed position.

Also, it will be understood that the there will be an increase in potential energy stored in the coil spring 160 if a force acts against and in excess of the spring's biasing force to deform (extend) the spring 160 by moving the sliders 150 away from one of the ends 156. This force acting against the biasing force could be supplied by, for example, torque from the one or more pinions 133 turned by drive motor 202 of the slide assembly. When moving the top body 84 from either the open position to the closed position, or vice versa, the motor 202 must apply sufficient torque to get the spring 174 past it maximum level of expansion at the widest point between slots 140 (where its stored energy is at a maximum)—beyond that point, the spring then releases its stored energy and cooperates with the motor to move the top body to the desired position.

The operation of movement and vibration system 20 in the context of devices 10 and 10A to open and close such devices will be appreciated from the above description. As noted above, in addition to using the drive motor 202 to effect relative movement to the top and bottom bodies 84 and 88 to open and close the device 10 and 10A, the movement and vibrations system 20 can also use the drive motor 202 to generate a vibration alert to a user of the device 10,10A, as will now be explained in greater detail.

Devices such as the devices 10 and 10A can be made to vibrate by repeatedly carrying out the following steps: i) quickly moving (for example, pulling) the bodies slightly away from either the fully opened or the fully closed position; and ii) allowing the biasing mechanism to bring the bodies back to the fully opened or fully closed position. It will be understood that step i) causes the biasing mechanism to store potential energy. For example, a spring urging the bodies to be maintained in the terminal position is deformed with the consequence being that potential energy is stored in the spring while the spring is in the deformed state. Subsequently, the stored potential energy is released from the biasing mechanism during step ii). Quickly repeating these steps results in vibration of the device 10,10A. As the potential energy is released from the biasing mechanism, one of the bodies (or both if, for example, neither body is held stationary) accelerate from momentary rest towards the terminal (i.e. fully opened or fully closed) position. The momentum(s) of the bodies thus increase until collision between parts of the device at the terminal position. (The colliding parts will vary depending on the device. For the example device 10, the colliding parts might be adjacent faces of the bodies 84 and 88 when vibrating in the closed position, and the interaction of parts of the hinge assembly 92 when in the open position. For the example device 10A, the colliding parts might be the sliders 150 and the ends 156 of the slots 140.)

The above described vibration method can be carried out automatically by repeatedly driving or pulsing the motor 102 of the movement and vibration system of the device 10/10A. In particular, the opener/closer motor is controlled to cyclically deliver variable amounts of mechanical energy per unit time to cause the following two steps to repeatedly occur: i) the motor first provides sufficient power to just overcome the force of the spring mechanism urging the bodies 84, 88 into the fully opened or closed position and thereby slightly move the bodies 84 relative to each other; and ii) the motor stops providing power, at which point the spring force takes over to return the bodies to the fully opened or closed position. No net relative movement of the bodies occurs at the end of each cycle because the biasing mechanism always brings the bodies back to their original position.

Referring again to FIG. 1, as noted above the movement and vibration system 20 includes a controller 200 for controlling the operation of motor 202 to alternatively open and close the device 10, 10A or generate a vibrational alert. The controller 200 will actuate a motor 202 vibrations upon receipt of a vibration request. The location sensor 210 provides feedback to the controller 200 as to the relative locations of the top and bottom bodies 84, 88, providing an indication as to whether the electronic communication device has been brought to a fully opened or fully closed position. The controller 200 may include malfunction/error detection functions that interact with the location sensor 210, the motor 202, and the electronic device's microprocessor so that an appropriate malfunction or error event sequence occurs in the case of a malfunction or error (e.g. malfunction or error in the controller 200, the sensor 210 or the motor 202).

In at least some examples, the vibration request 208 is generated by a software application running on the microprocessor 38 (FIG. 1). For example, the phone application 60 might generate a vibration request to notify the device user of an incoming call. In some examples, such a vibration request would continue to be sent to the controller 200 for a predetermined duration or until the device user presses an appropriate key on the keyboard or keypad 32 for answering the incoming call, or the call is forwarded to a voice message system. In another example, the vibration request could be generated by the messaging application 64 in response to, for example, an incoming e-mail or text message. In yet another example, the vibration request could be generated by the alarm application 66 when, for example, a preset time and date is reached.

As suggested above, in some examples, the controller 200 can include both a software module stored in the electronic communication device's memory and one or more hardware components in direct communication with the motor 202 and the location sensor 210. In these examples, the software module would provide information to the controlling subsystem's hardware components so that the motor 202 will be pulsed in a manner to create the vibrations 206. In other examples, some or part of the functionality of the software module of the controller 200 can be implemented through firmware or hardware components instead of, or in combination with, computer software instructions executed by the microprocessor 38 (or other processors).

As previously explained, the motor 202 has a dual function. In one mode (an open/close device mode), it is used to automatically open or close the device 10,10A when the controller 200 receives a "movement request" (which may be initiated by a user through open/close button 204, for example. In a second mode of operation (a vibration mode), the motor 202 is used to generate the vibrations 206 when pulsed. In vibration mode, the motor 202 repeatedly performs two steps. First the motor 202 moves one body relative to the other body with sufficient force to overcome the initial resisting force (which could be torque or linear force) of the biasing mechanism of the device 10. By doing this, the two bodies of the device 10,10A are urged slightly out of either the fully open or fully closed position. At the second step, power delivered by the motor 202 is ceased (or at least substantially diminished). With torque from the motor 202 at least substantially diminished, the force of the biasing mechanism of the device 10, 10A takes over to bring the body back to the fully closed or opened position. At this point, the cycle begins again.

As the controller 200 is able to determine whether the device 10 is either in the fully closed or fully open position, then the controller 200 is able to control the motor 202 to rotate in the appropriate direction based on the position (in one direction when the device 10 is in the fully open position and in the opposite direction when the device 10 is in the fully closed position). Thus, the state of the location sensor 210 is referenced by the controller 200 to permit correct operation. The location sensor 210 can be one or more magnetic switches, proximity switches, mechanical switches, etc.

Although biasing mechanisms that have been described can maintain the two bodies in both the fully opened and fully closed positions, biasing mechanisms in some example embodiments are only able to maintain the two bodies in one terminal position such as the fully closed position. For example, in one alternative example of the device 10, the device 10 includes a spring mechanism for urging the bodies into the fully closed position, but in the fully open position the bodies are locked in place by a latch mechanism releasable by a user depressible latch release. In one configuration of this alternative example, device vibration is only carried out when the device is closed. In another configuration of this alternative example, vibration can still occur in the open position as long as there is a limited degree of play between the bodies when the latched open position—the motor 102 can be activated to repeatedly try to move the bodies towards the closed position, which movement will be limited by the latch mechanism, such that the minute movements of the bodies will result in vibrations of the device. Similarly, in yet another alternative embodiment, a latch mechanism releasable by a user depressible latch release may be used to secure the device in the fully closed position with a limited degree of play between the bodies being permitted in the latched closed position so that the motor 102 can be activated to repeatedly try to move the bodies towards the open position, which movement will be limited by the latch mechanism, resulting in vibrations of the device. Thus, in some embodiments having latch mechanisms, the latch mechanism effectively acts as a bias mechanism for acting against the motion of the drive motor to cause vibrations of the device.

It will be appreciated that the biasing mechanisms used to apply biasing forces to the bodies 84, 88 could take many different configurations other than what is noted above, and also that the hinge and slide assemblies could take many different configurations other than that described above. Furthermore, in some example embodiments, an external biasing mechanism is not provided to bias the device bodies 84/88 into either relative open or closed positions; rather, the motor 202 is used to maintain the device bodies 84/88 in their relative positions until a user actuates open/close button 204, or a vibration request is received. In such embodiments, vibration is achieved by sequentially driving or pulsing the motor 202 in minute amounts in opposite directions to generate vibration-causing movements. By way of example, the biasing hinge pin assembly 170 can be omitted from device 10, and the biasing mechanism (for example spring 160) of sliding assembly 132 omitted from the device 10A in some embodiments in which opposite directional pulsing of the motor is used to vibrate the device. In some embodiments, a spring loaded clutch mechanism can be provided to disengage the motor 202 to allow a user to manually move bodies 84/88 relative to each other.

The device 10 may be a handheld device; however at least some embodiments of the invention are not restricted to handheld devices. Also, phone communications in the context of embodiments of the invention are not restricted to those carried out over wireless networks. If the electronic device is a cellular phone, a phone communication would normally be received from a wireless WAN or WLAN, but as another example, if the electronic communication device comprised the handset of a portable telephone, phone communications would normally be delivered to the handset by way of short-range radio signals.

Certain adaptations and modifications of the described embodiments can be made. Therefore, the above discussed embodiments are considered to be illustrative and not restrictive.

What is claimed is:

1. A device comprising:
a first body;
a second body mounted to the first body for movement relative to the first body between closed and open positions, wherein in the closed position the second body covers a selected surface portion of the first body, and in the open position the selected surface potion of the first body is exposed to a user of the device;
an electronic drive motor linked to first body and the second body for moving the bodies relative to each other, the drive motor being operable in a first mode for effecting movement of the second body from the closed position to the open position and operable in a second mode for effecting repetitive movement of the second body relative to the first body for generating a vibration alert;
a controller for controlling the electronic drive motor; and
a biasing mechanism connected to the first body and the second body and applying a biasing force urging the second body into the closed position when the second body is in the closed position and urging the second body into the open position when the second body is in the open position, wherein the drive motor is operative in the second mode when the second body is in the closed position to repeatedly: (i) act against the biasing force to slightly move the second body away from the closed position and then (ii) permit the biasing force to move the second body back to the closed position, thereby generating the vibration alert; and wherein the drive motor is operative in the second mode when the second body is in the open position to repeatedly (i) act against the biasing force to slightly move the second body away from the open position and then (ii) permit the biasing force to move the second body back to the open position, thereby generating the vibration alert.

2. The device of claim 1 wherein the first body includes a user input interface at least partially located on the selected surface portion.

3. The device of claim 2 wherein the second body houses a display screen.

4. The device of claim 1 wherein the biasing mechanism includes a spring that reaches a maximum level of displacement relative to a neutral spring position when the second body is positioned substantially at a midpoint between the open and closed positions.

5. The device of claim 1 wherein the device is a flip-style device with the first body and the second body being hinged together by a hinge assembly, the drive motor being located in the hinge assembly.

6. The device of claim 1 wherein the device is a slide-style device with the first body and the second body being connected to each other by a slide assembly for relative linear movement, the drive motor being part of the slide assembly.

7. The device of claim 1 wherein in the second mode the drive motor is repeatedly driven in opposite directions in minute amounts thereby generating the vibration alert.

8. The device of claim 1 wherein the device is a wireless enabled device for receiving communications over a wireless network and includes a communications application executable on the controller for generating a vibration request to trigger operation of the drive motor in the second mode when the mobile device receives notification of a new communication.

9. The device of claim 1 wherein the controller is housed within at least one of the first and second bodies, the controller controlling the drive motor to operate in the second mode upon receiving a vibration request and the controller controlling the drive motor to operate the drive motor in the first mode upon receiving a movement request to open or close the device.

10. The device of claim 9 including a location sensor in communication with the controller for providing feedback to the controller about the relative locations of the first and second bodies.

11. The device of claim 9 including a microprocessor housed within at least one of the first and second bodies, wherein at least part of the controller is implemented by software instructions executed by the microprocessor.

12. The device of claim 1 including a releasable latch for securing the second body in the closed position.

13. The device of claim 12 wherein the releasable latch permits a limited degree of play between the first and second bodies when the second body is in the closed position.

14. A method for effecting vibrations in a mobile electronic device having a first body and a second body movably mounted together, a drive motor for moving one body relative to the other body between a closed position and an open position in a first mode of operation, a controller for controlling the drive motor, and a biasing mechanism for applying a biasing force biasing the first and second bodies in the closed position when the first and second bodies are in the closed position and for applying a biasing force biasing the first and second bodies in the open position when the first and second bodies are in the open position, the method including:
in a second mode of operation, driving the motor to repeatedly move one body relative to the other body to cause the mobile electronic device to vibrate, including; (a) when the bodies are in the closed position, pulsing the drive motor to repeatedly: (i) act against the biasing force to slightly move the bodies away from the closed position and then (ii) permit the biasing force to move the bodies back to the closed position; and (b) when the bodies are in the open position, pulsing the drive motor to repeatedly: (i) act against the biasing force to slightly move the bodies away from the open position and then (ii) permit the biasing force to move the bodies back to the open position.

15. The method of claim 14 wherein in the second mode the drive motor is repeatedly driven in opposite directions in minute amounts thereby to cause the mobile electronic device to vibrate.

16. The method of claim 14 wherein the device is a flip-style device with the first body hinged to the second body.

17. The method of claim 14 wherein the device is a slide-style device wherein the first body is slidably mounted for linear movement relative to the second body.

18. A computer program product having a computer-readable medium tangibly embodying computer executable instructions for effecting vibrations in a device having a first body and a second body movably mounted together, a drive motor for moving one body relative to the other body between a closed position and an open position in a first mode of operation, a controller for controlling the drive motor, and a biasing mechanism for applying a biasing force biasing the first and second bodies in the closed position when the first and second bodies are in the closed position and for applying a biasing force biasing the first and second bodies in the open position when the first and second bodies are in the open, the instructions comprising instructions for in a second mode of operation, driving the drive motor to repeatedly move one body relative to the other body to cause the mobile electronic device to vibrate, including; (a) when the bodies are in the closed position, pulsing the drive motor to repeatedly: (i) act against the biasing force to slightly move the bodies away from the closed position and then (ii) permit the biasing force to move the bodies back to the closed position; and (b) when the bodies are in the open position, pulsing the drive motor to repeatedly: (i) act against the biasing force to slightly move the bodies away from the open position and then (ii) permit the biasing force to move the bodies back to the open position.

* * * * *